United States Patent
Takada et al.

(10) Patent No.: US 11,444,857 B2
(45) Date of Patent: Sep. 13, 2022

(54) NETWORK INFORMATION COLLECTION DEVICE AND METHOD THEREFOR

(71) Applicant: Nippon Telegraph and Telephone Corporation, Tokyo (JP)

(72) Inventors: Atsushi Takada, Musashino (JP); Naoyuki Tanji, Musashino (JP); Kyoko Yamagoe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/427,762

(22) PCT Filed: Jan. 30, 2020

(86) PCT No.: PCT/JP2020/003472
§ 371 (c)(1),
(2) Date: Aug. 2, 2021

(87) PCT Pub. No.: WO2020/166358
PCT Pub. Date: Aug. 20, 2020

(65) Prior Publication Data
US 2022/0131775 A1 Apr. 28, 2022

(30) Foreign Application Priority Data
Feb. 13, 2019 (JP) .............................. JP2019-023522

(51) Int. Cl.
*G06F 15/173* (2006.01)
*H04L 43/067* (2022.01)
(Continued)

(52) U.S. Cl.
CPC .......... *H04L 43/067* (2013.01); *H04L 43/022* (2013.01); *H04L 43/04* (2013.01); *H04L 43/062* (2013.01)

(58) Field of Classification Search
CPC ..... H04L 43/067; H04L 43/022; H04L 43/04; H04L 43/062
(Continued)

(56) References Cited

U.S. PATENT DOCUMENTS 10,142,860 B2 * 11/2018 Jain ....................... H04W 24/10

FOREIGN PATENT DOCUMENTS

| CN | 102938708 | 2/2013 |
| CN | 108600009 | 9/2018 |

(Continued)

OTHER PUBLICATIONS

Itoi et al., "Automatic Failure Location Estimation Technology Aimed at Increasing Knowledge and Speeding Up Failure Response Operations," NTT Technology Journal, 2017, 29(5):60-64, 11 pages (With English Translation).
Nakamura et al., "Study on Multi-Layer Configuration Management Technique Using Traffic Information," IEICE Technical Report, 2019, 118(420):9-14, 17 pages (With English Translation).
(Continued)

*Primary Examiner* — Karen C Tang
(74) *Attorney, Agent, or Firm* — Fish & Richardson P.C.

(57) ABSTRACT

A network information collection device is provided, which connects, for example, artificial intelligence with each of a plurality of systems in one-to-one relationships. It includes an information collection and accumulation unit 10 which collects and accumulates information from each of management systems 71 to 75 for managing a plurality of devices constituting a network, a related information generation unit 20 which generates related information by associating connection relationships of the plurality of devices managed by the management systems 71 to 75 with the information, and a delivery unit 30 which delivers the related information to the outside with a specified granularity, the related information generation unit 20 includes a log aggregation unit 21
(Continued)

which records changes in a state of each of the plurality of devices, an inter-layer association unit 22 which associates the inter-layer connection relationships of the devices with the information, and a chronological arrangement unit 23 which chronologically arranges the changes in the states recorded in the log aggregation unit 21 and the information.

8 Claims, 5 Drawing Sheets

(51) Int. Cl.
  *H04L 43/022* (2022.01)
  *H04L 43/04* (2022.01)
  *H04L 43/062* (2022.01)
(58) Field of Classification Search
  USPC .......................................................... 709/224
  See application file for complete search history.

(56) References Cited

FOREIGN PATENT DOCUMENTS

| | | |
|---|---|---|
| JP | 2015226234 | 12/2015 |
| JP | 2017038111 | 2/2017 |
| JP | 2017069912 | 4/2017 |
| JP | 2018147172 | 9/2018 |

OTHER PUBLICATIONS

Okura et al., "Proactive Multipath QoS Control for IP-Based Cellular Network," IEICE Technical Report, 2004 104(276):31-34, 11 pages (With English Translation).

Ishibashi et al., "Advanced network design and operation through machine learning and data analysis," NTT Technical Journal, 2015, 27(12):29-33, 11 pages (with English Translation).

* cited by examiner

NETWORK INFORMATION COLLECTION DEVICE AND METHOD THEREFOR

CROSS-REFERENCE TO RELATED APPLICATIONS

This application is a National Stage application under 35 U.S.C. § 371 of International Application No. PCT/JP2020/003472, having an International Filing Date of Jan. 30, 2020, which claims priority to Japanese Application Serial No. 2019-023522, filed on Feb. 13, 2019. The disclosure of the prior application is considered part of the disclosure of this application, and is incorporated in its entirety into this application.

TECHNICAL FIELD

The present invention relates to a technique for collecting information from devices constituting a network.

BACKGROUND ART

As a technique for collecting information from devices constituting a network, for example, a technique for collecting and accumulating alerts from communication devices, and displaying alarm information on terminals for managers is disclosed in Patent Literature 1. Further, a technique for collecting performance information from transmission devices and displaying the collected information on upper interfaces, or terminals for managers is disclosed in Patent Literature 2.

Furthermore, for service providers, a collective management system by which information or functions from a plurality of providers can be utilized is disclosed in Patent Literature 3.

CITATION LIST

Patent Literature

Patent Literature 1: Japanese Patent Laid-Open No. 2017-69912
Patent Literature 2: Japanese Patent Laid-Open No. 2015-226234
Patent Literature 3: Japanese Patent Laid-Open No. 2017-38111

SUMMARY OF THE INVENTION

Technical Problem

However, techniques disclosed in above literatures cannot provide information covering a plurality of hierarchies (layers) in the same service. Herein a hierarchy means a difference in actions such as transmissions and transfers. In some cases, it means a data link layer, a network layer, and a transport layer, etc. of the OSI reference model. Therefore, information must be acquired per hierarchy corresponding to each of management systems which keep information necessary for services.

For example, assuming that artificial intelligence is made to conduct analysis and determination about responses to failures in devices constituting a network, the analysis and determination needs to be conducted considering a plurality of points. Therefore, input information to artificial intelligence needs to be, for example, alert information, traffic information, quality information, and combinations thereof.

In this case, it is necessary to connect each of a plurality of management systems with artificial intelligence per hierarchy. In other words, when artificial intelligence is made to conduct analysis and determination based on certain information in place of people, it is necessary to connect artificial intelligence with a plurality of management systems which keep information, in a one-to-many relationship, causing a problem that the entire system will be complicated.

In view of this problem, an object of the present invention is to provide a network information collection device and a method thereof which connect, for example, artificial intelligence with each of a plurality of management systems in one-to-one relationships.

Means for Solving the Problem

In summary, a network information collection device according to an aspect of the present invention includes an information collection and accumulation unit which collects and accumulates information from each of management systems for managing a plurality of devices constituting a network, a related information generation unit which generates related information by associating connection relationships of the plurality of devices managed by the management systems with the information, and a delivery unit which delivers the related information to the outside with a specified granularity.

Also in summary, a network information collection method according to an aspect of the present invention is a network information collection method performed by a network information collection device, and includes an information collection and accumulation step of collecting and accumulating information from each of management systems for managing a plurality of devices constituting a network, a related information generation step of generating related information by associating connection relationships of the plurality of devices managed by the management systems with the information, and a delivery step of delivering the related information to the outside with a specified granularity.

Effects of the Invention

The present invention can provide a network information collection device and a method thereof which connect, for example, artificial intelligence with each of a plurality of management systems in one-to-one relationships.

DESCRIPTION OF EMBODIMENTS

Figure 1:
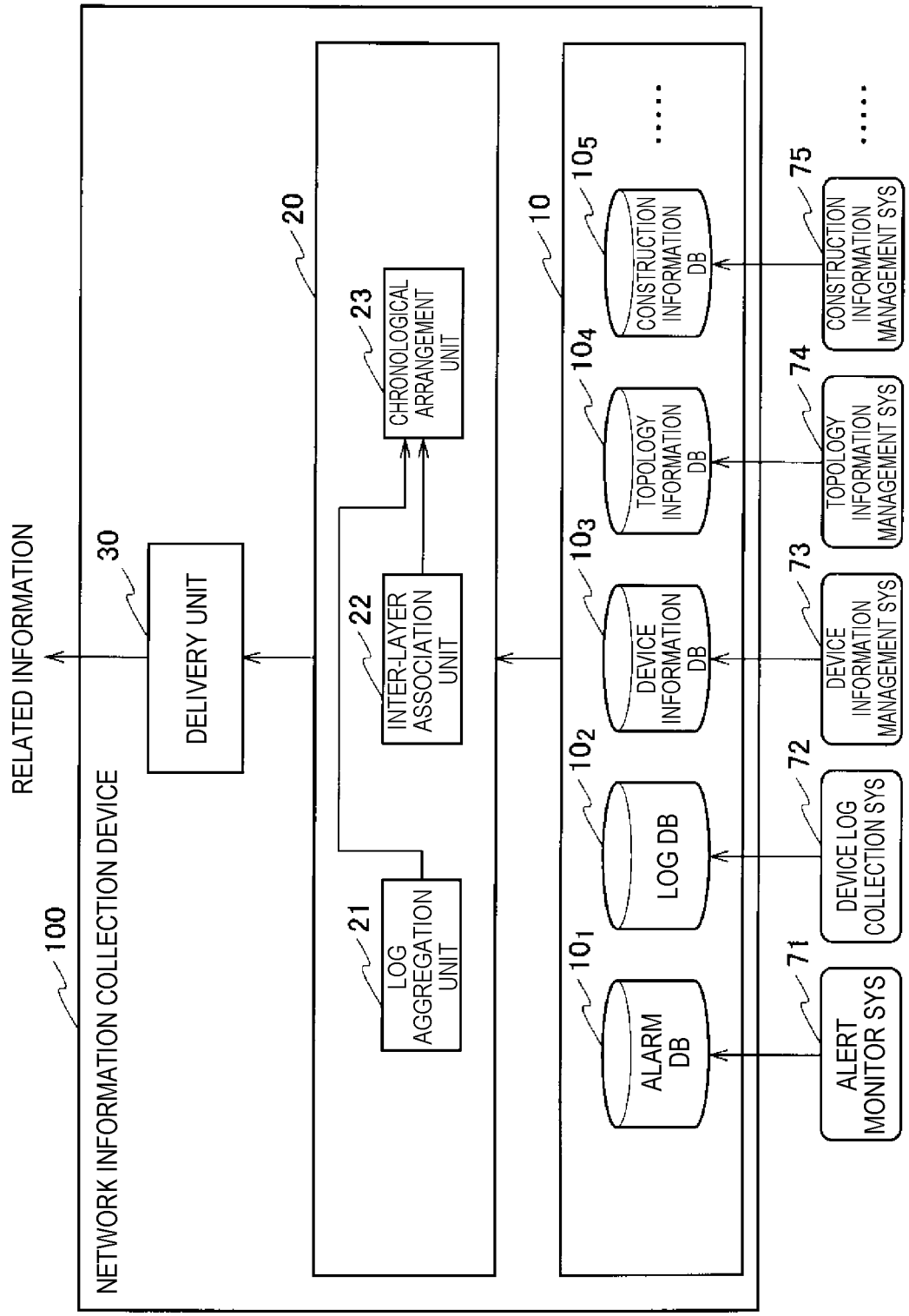
FIG. 1 is a block diagram showing a functional configuration example of a network information collection device according to a first embodiment of the present invention.

In the following, embodiments of the present invention are described using the drawings. In the plurality of drawings, the same objects are referred to with the same reference characters, and descriptions thereof are not repeated.

First Embodiment

Figure 2:
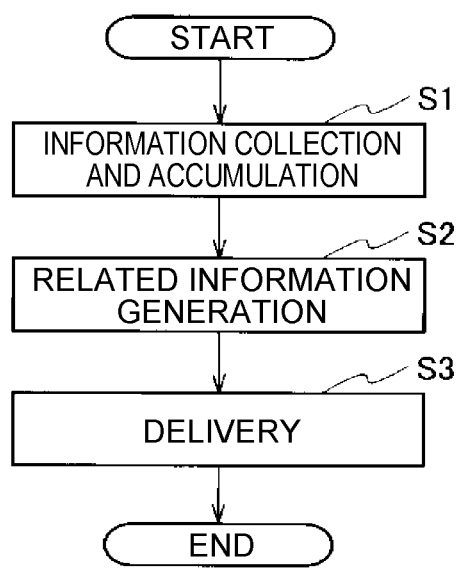
FIG. 2 is a flowchart showing a schematic processing procedure of the network information collection device shown in FIG. 1.

FIG. 1 is a block diagram showing a functional configuration example of a network information collection device according to a first embodiment of the present invention. FIG. 2 is a flowchart showing a schematic processing procedure of the network information collection device 100 shown in FIG. 1.

A network information collection device 100 includes an information collection and accumulation unit 10, a related information generation unit 20 and a delivery unit 30. The network information collection device 100 can be implemented, for example, by means of a computer consisting of ROMs, RAMS, CPUs, etc. When each functional configuration unit is implemented by means of a computer, processing contents of functions which each functional configuration unit should have are described with a program. This applies to the other embodiment described below.

In the following description, an example is described where the network information collection device 100 delivers the collected related information to external artificial intelligence. Artificial intelligence (not shown) is described, for example, using alarm correlation AI as an example. Alarm correlation AI is artificial intelligence which analyzes and determines correlations among a plurality of failure messages to identify a main factor alarm.

In the example shown in FIG. 1, a plurality of devices constituting a network are not illustrated. Instead of illustrating the plurality of devices, an example is illustrated where an alert monitor Sys 71 for monitoring the plurality of devices constituting the network, a device log collection Sys 72 for collecting and recording states of each device, a device information management Sys 73 which has recorded device information of each device, a topology information management Sys 74 which has recorded information representing connection configurations (forms) of each device, construction information management Sys 75 which has recorded construction information of each device, and also SLA information management Sys (not shown) which has recorded levels of service quality assurances of each device, etc. are connected. In other words, the plurality of devices constituting the network and the network information collection device 100 are connected via each management system.

The information collection and accumulation unit 10 collects and accumulates information from each of the management systems for managing the plurality of devices constituting the network (step S1). Information collected from each device are recorded in a database (DB) corresponding to each device.

As shown in FIG. 1, alarm information issued by the alert monitor Sys 71 are recorded in an alarm DB $10_1$. Besides, states of each device collected by the device log collection Sys 72 are recorded in a log DB $10_2$. This also applies to other management system.

Figure 3:
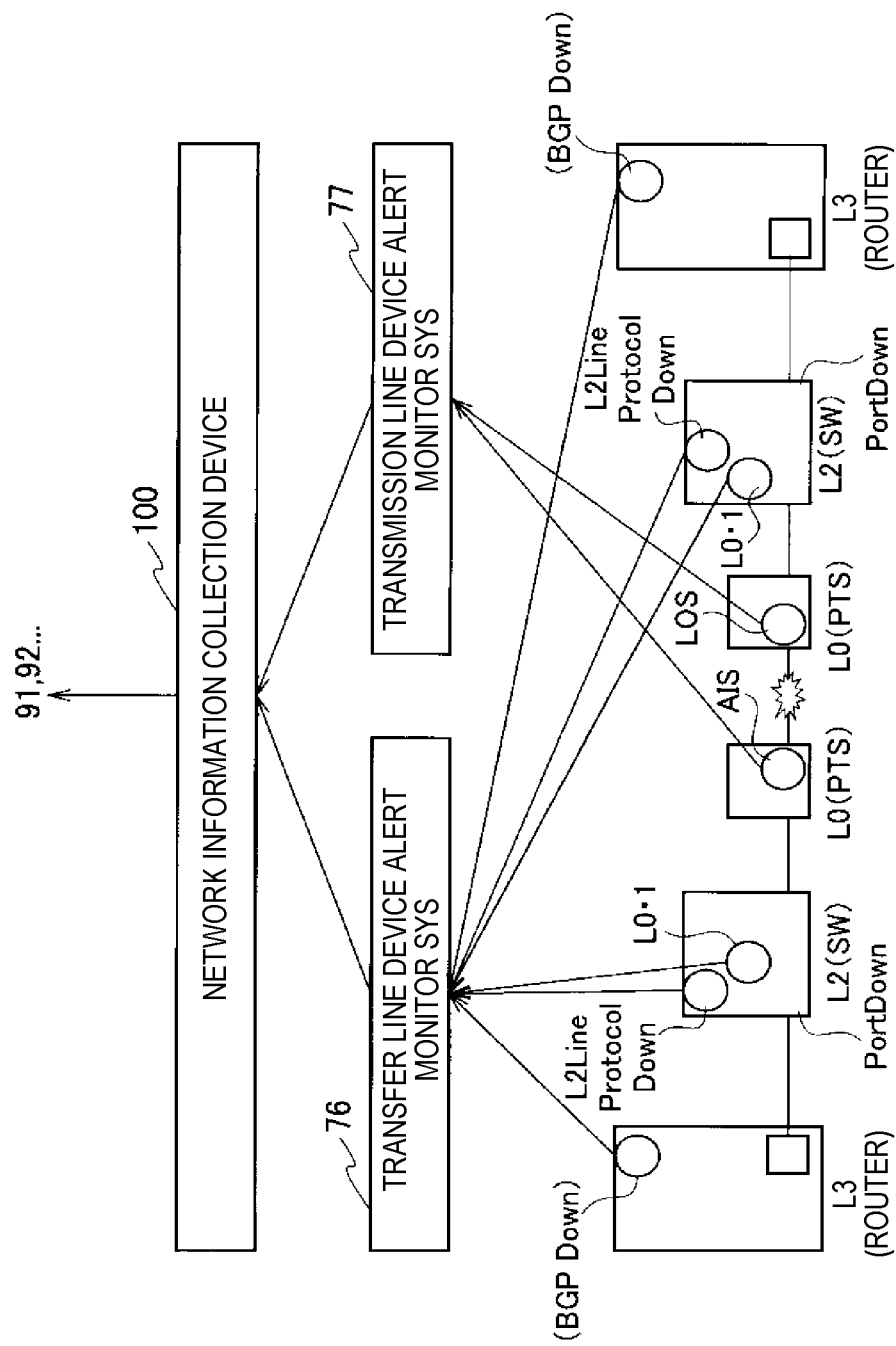
FIG. 3 schematically shows a specific example of network failure.

FIG. 3 schematically shows a specific example of connections between the devices constituting the network and the network information collection device 100. The network shown in FIG. 3 has a configuration where a device (router) 80 and a device 81 (router) in a network layer (L3) are connected. In FIG. 3, an example is shown where, for example, a transfer line device alert monitor system 76 and a transmission line device alert monitor system 77 are deployed between the network information collection device 100 and the devices.

As shown in FIG. 3, if failure occurs on an optical transmission line connecting between routers, an alarm of AIS is issued from a physical layer of one device 80, and an alarm of LOS is issued from the other device 81. The alarms AIS and LOS are monitored by the transmission line device alert monitor system 77.

After that, the alarms are spread to a data link layer and a network layer to form various spread alarms. Various spread alarms are monitored by the transfer line device alert monitor system 76. Management systems may also be provided per layer in such a way.

These alarms are recorded in each database (DB) not shown in FIG. 3. Each alarm is not necessarily recorded in each database (DB, FIG. 1) sequentially from an alarm from the lowest layer. Depending on traffic of the network, alarms of upper layers may be recorded earlier, for example, in the alarm DB $10_1$. This also applies to other databases (DB).

The related information generation unit 20 (FIG. 1) generates related information by associating connection relationships of a plurality of devices with information from each device (step S2). Herein, each information refers to above described AIS, LOS, and BGPDown, etc.

The connection relationship of the device can be obtained by referring to the topology information DB $10_4$ based on an IP address accompanying each alarm information. The related information generation unit 20 generates related information by correlating the connection relationship obtained by referring to the topology information DB $10_4$ with an alarm recorded in the alarm DB $10_1$.

The related information is digital information representing a situation of the failure shown in FIG. 3. Specific configurations of the related information generation unit 20 are described later.

The delivery unit 30 delivers the related information to the outside with a specified granularity (step S3). A granularity is the size of one piece of information required by an external device (in this example, alarm correlation AI). For example, it means "per second", "per minute", etc. The granularity is preset in the delivery unit 30. Furthermore, the granularity may be variable. An example is described later where the granularity is variable.

As described above, the network information collection device 100 according to this embodiment includes the information collection and accumulation unit 10, the related information generation unit 20 and the delivery unit 30. The information collection and accumulation unit 10 collects and accumulates information from each of the management systems for managing the plurality of devices constituting the network. The related information generation unit 20 generates related information by associating connection relationships of a plurality of devices 80, 81 managed by the management systems with information collected from the management system. The delivery unit 30 delivers the related information to the outside with a specified granularity. In this way, a network information collection device 100 can be provided, which connects, for example, artificial intelligence with each of a plurality of management systems in one-to-one relationships.

In other words, as shown in FIG. 1, the connection relationships between the management systems for managing the plurality of devices constituting the network, and the network information collection device 100 are one-to-one relationships. Therefore, there can be fewer connection points for connecting each of the plurality of management systems with, for example, artificial intelligence. As a result, this can contribute to cost reduction and shorter delivery time of the entire system.

(Related Information Generation Unit)

With reference to FIG. 1, a configuration of the related information generation unit 20 is described in more detail. The related information generation unit 20 includes a log aggregation unit 21, an inter-layer association unit 22 and a chronological arrangement unit 23.

The log aggregation unit 21 records changes in a state of each of the plurality of devices 80, 81. The change in a state means, for example, that a switch (SW) of the data link (L2) layer in the example shown in FIG. 3 changes from "L0•1PortDown" to "L2LineProtocolDown."

The inter-layer association unit 22 associates inter-layer connection relationships of the plurality of devices 80, 81 with information recorded in the information collection and accumulation unit 10. The inter-layer association unit 22 generates digital information by associating connection configuration of the network shown in FIG. 3 with alarms.

The chronological arrangement unit 23 chronologically arranges the changes in states recorded in the log aggregation unit 21 and the digital information generated by associating connection configuration of the network with alarms in the inter-layer association unit 22. As described above, information (alarms) may be in different orders depending on traffic situations, therefore the related information may be chronologically rearranged.

As described above, the related information generation unit 20 includes the log aggregation unit 21, the inter-layer association unit 22 and the chronological arrangement unit 23. The log aggregation unit 21 records changes in a state of each of the plurality of devices 80, 81 managed by the management systems. The inter-layer association unit 22 associates inter-layer connection relationships of the devices 80, 81 with information recorded in the information collection and accumulation unit 10. The chronological arrangement unit 23 chronologically arranges the changes in states recorded in the log aggregation unit 21 and the information generated by the inter-layer association unit 22. In this way, related information generation unit 20 can generate related information not affected by traffic. Therefore, for example artificial intelligence can be provided with correct input information.

Moreover, functions of the related information generation unit 20 are not limited to the above example. For example, there may be a function for unifying different formats of time information sent from management systems in different layers into one format (for example YYYYMMD-DHHMMSS). There may also be a function for making up for loss of information.

Second Embodiment

Figure 4:
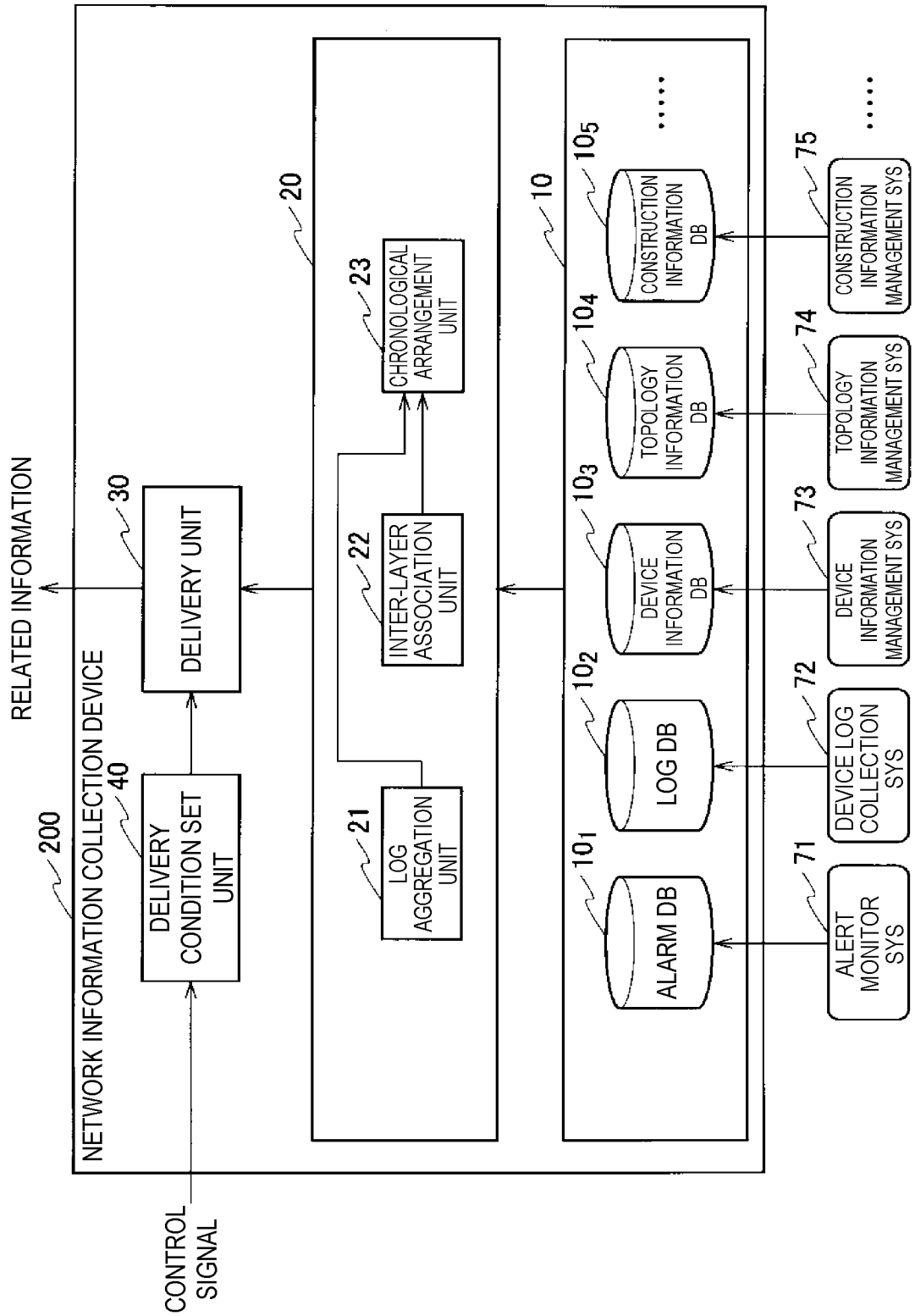
FIG. 4 is a block diagram showing a functional configuration example of a network information collection device according to a second embodiment of the present invention.

FIG. 4 is a block diagram showing a functional configuration example of a network information collection device according to the first embodiment of the present invention. The network information collection device 200 shown in FIG. 4 is different from the network information collection device 100 (FIG. 1) in that it includes a delivery condition set unit 40.

The delivery condition set unit 40 changes a granularity of related information by operation from the outside. "The outside" means, for example, a terminal (not shown) operated by a user who wants to make artificial intelligence to analyze a main factor alarm. The terminal is composed of, for example, a personal computer.

The delivery condition set unit 40 changes a granularity of related information delivered to the outside by the delivery unit 30, based on a control signal from the terminal operated by the user. The delivery condition set unit 40, for example, changes an interval with which each related information is delivered, from a second to a minute. In addition, related information may be delivered to another delivery destination.

With the delivery condition set unit 40, the network information collection device 200 can be connected to, for example, different artificial intelligence. The delivery condition set unit 40 can also disconnect artificial intelligence of a delivery destination. In other words, when new artificial intelligence is necessary to respond to change of operation policy or appearance of new technique, the delivery condition set unit 40 can easily and rapidly replace old type of artificial intelligence.

Moreover, it is convenient that control signals from terminals operated by users comply with application programming interface (hereinafter, shortly called API) specifications. An API is a scheme for utilizing information or functions etc. of other systems through exchange of data.

In recent years, various network services are provided in the form of an application programming interface (hereinafter, API). Operating the delivery condition set unit 40 with control signals compliant with API specifications, a granularity of related information delivered by the delivery unit 30 can be changed, for example, by HTTP methods such as GET, POST, PUT, DELETE.

In short, a granularity of related information delivered by the delivery unit 30 may be changed in compliance with API specifications. This can make operations of the delivery condition set unit 40 easy to understand.

As described above, with the network information collection device 100, 200 according to this embodiment, a network information collection device and a method thereof can be provided, which connect, for example, artificial intelligence with each of a plurality of management systems in one-to-one relationships.

Figure 5:
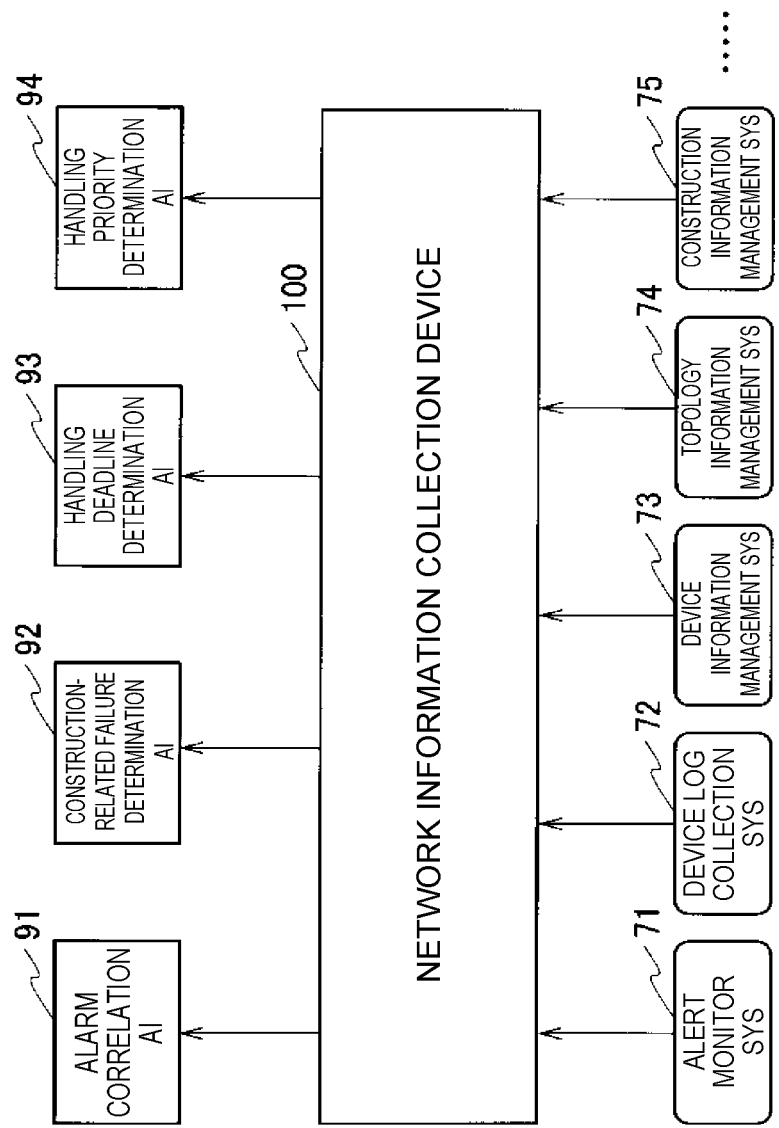
FIG. 5 is a block diagram showing a connection example of the network information collection device shown in FIG. 1 and artificial intelligence.

Moreover, the example has been described where the network information collection devices 100, 200 deliver related information to one artificial intelligence, but the present invention is not limited to this example. As shown in FIG. 5, related information may be delivered to each of a plurality of artificial intelligences 91 to 94. The alarm correlation AI denoted by a reference character 91 is the artificial intelligence described in the first embodiment. Accordingly, even in a configuration where there are a plurality of management systems 71 to 75 and a plurality of artificial intelligences 91 to 94, connections between each management system 71 to 75 and the network information collection device 100, and between each artificial intelligence and the network information collection device 100 are one-to-one relationships.

In other words, according to this embodiment, effectively connections between management systems for managing a plurality of devices constituting a network and, for example, artificial intelligence are not complicated. Moreover, the above embodiment has been described with an example where the network information collection device according to this embodiment is deployed between artificial intelligences and management systems, but is not limited to this example. Related information may be delivered to destinations other than artificial intelligence.

It goes without saying that the present invention includes various embodiments etc. not described herein. Therefore, the technical scope of the present invention shall be defined only by matters used to specify the invention according to the claims deemed reasonable from the above description.

REFERENCE SIGNS LIST 100, 200 network information collection device
10 information collection and accumulation unit
$10_1$ alarm DB
$10_2$ log DB
$10_3$ device information DB
$10_4$ topology information DB
$10_5$ construction information DB
20 related information generation unit
30 delivery unit
40 delivery condition set unit
71 alert monitor Sys (management system)
72 device log collection Sys (management system)
73 device information management Sys (management system)
74 topology information management Sys (management system)
75 construction information management Sys (management system)
76 transfer line device alert monitor Sys (management system)
77 transmission line device alert monitor Sys (management system)
80, 81 device (router)
91 alarm correlation AI
92 construction-related failure determination AI
93 handling deadline determination AI
94 handling priority determination AI

The invention claimed is:

1. A network information collection device comprising one or more processors configured to perform:
 a collecting and accumulating information from each of management systems for managing a plurality of devices constituting a network,
 obtaining inter-layer connection relationships of the plurality of devices by referring to topology information of the plurality of devices based on IP addresses accompanying the information,
 a generating related information by associating the obtained inter-layer connection relationships of the plurality of devices with the information, and
 a delivering the related information to outside with a specified granularity.

2. The network information collection device according to claim 1, wherein generating the related information comprises
 a recording changes in a state of each of the plurality of devices,
 a associating the inter-layer connection relationships of the devices with the information, and
 a chronologically arranging the recorded changes in the states and the information.

3. The network information collection device according to claim 1, wherein the one or more processors are further configured to perform:
 a changing the granularity of the related information by operation from the outside.

4. The network information collection device according to claim 3, wherein the operation is performed in compliance with application programming interface specifications.

5. A network information collection method performed by a network information collection device, the network information collection method comprising
 a collecting and accumulating information from each of management systems for managing a plurality of devices constituting a network,
 obtaining inter-layer connection relationships of the plurality of devices by referring to topology information of the plurality of devices with IP addresses accompanying the information;
 a generating related information by associating the obtained inter-layer connection relationships of the plurality of devices with the information, and
 a delivering the related information to outside with a specified granularity.

6. The network information collection method according to claim 5, wherein generating the related information comprises
 recording changes in a state of each of the plurality of devices,
 associating the inter-layer connection relationships of the devices with the information, and
 chronologically arranging the recorded changes in the states and the information.

7. The network information collection method according to claim 5, further comprising
 changing the granularity of the related information by operation from the outside.

8. The network information collection method according to claim 7, wherein the operation is performed in compliance with application programming interface specifications.

* * * * *